United States Patent [19]

Tamura

[11] 4,314,618
[45] Feb. 9, 1982

[54] SUSPENSION MECHANISM FOR TRACKED VEHICLES

[75] Inventor: Joji Tamura, Iwata, Japan

[73] Assignee: Yamaha Hatsudoki Kabushiki Kaisha, Iwata, Japan

[21] Appl. No.: 114,694

[22] Filed: Jan. 23, 1980

[30] Foreign Application Priority Data

Jan. 25, 1979 [JP] Japan .................. 54/7387

[51] Int. Cl.³ ........................... B62M 27/02
[52] U.S. Cl. .................. 180/193; 180/9.56; 305/24
[58] Field of Search .......... 180/193, 190, 9.5, 9.54, 180/9.56; 305/16, 24, 25, 60

[56] References Cited

U.S. PATENT DOCUMENTS

| | | | |
|---|---|---|---|
| 3,613,811 | 10/1971 | Brandli et al. | 180/193 |
| 3,707,198 | 12/1972 | Pierson | 180/9.54 |
| 3,719,242 | 3/1973 | Duclo | 180/193 |
| 3,913,693 | 10/1975 | Hale et al. | 180/193 |
| 3,933,213 | 1/1976 | Trowbridge | 305/24 |
| 3,944,005 | 3/1976 | Tomita | 180/193 |
| 4,093,033 | 6/1978 | Rosch | 180/9.56 |
| 4,222,453 | 9/1980 | Fixsen et al. | 180/193 |

Primary Examiner—Joseph F. Peters, Jr.
Assistant Examiner—Donn McGiehan
Attorney, Agent, or Firm—Fleit & Jacobson

[57] ABSTRACT

A vehicle having an endless track which is in driving engagement at the front end portion with an engine-driven wheel. A slide rail assembly is provided for engagement with the lower run of the endless track. The suspension mechanism includes a suspension spring assembly which is connected at the front end directly or indirectly with the slide rail assembly. The other end of the spring assembly is connected with the free end of a swingable arm which is pivotably mounted at the other end on the vehicle frame. The intermediate portion of the swingable arm is connected with the rear portion of the slide rail assembly through a linkage including a crank lever.

8 Claims, 4 Drawing Figures

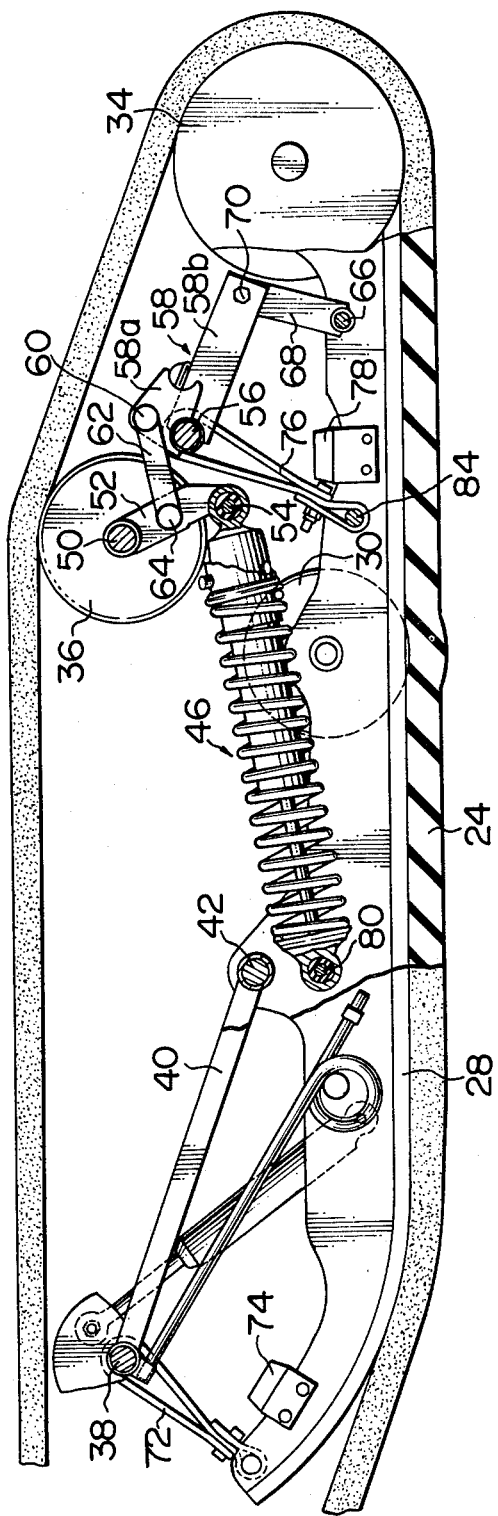

SUSPENSION MECHANISM FOR TRACKED VEHICLES

The present invention relates to suspension systems for tracked vehicles such as snowmobiles. More specifically, the present invention pertains to tracked vehicle suspension systems having improved shock absorbing characteristics.

In tracked vehicles such as snowmobiles having endless tracks or crawlers provided at the bottom portions of the vehicle frames, driving wheels are arranged to engage with the front end portions of the endless tracks. As taught in the U.S. Pat. Nos. 3,613,811; 3,719,242; 3,944,005; and 4,093,033, slide rails are provided so as to engage with the lower runs of the tracks. Such slide rails are carried by the vehicle frames through suspension springs and may be provided with idler wheels which roll on the lower runs of the tracks. Further idler wheels are also provided for engagement with the rear portions of the tracks.

In conventional structures, there have been inconveniencies in providing spaces for the suspension springs so that there have been limitations in having sufficient freedoms of movements and strokes of the suspension springs. Thus, it has been difficult to provide satisfactory suspension systems and problems of bottoming of the springs have often been encountered. Such problems cannot be eliminated even when the suspension springs are arranged obliquely as taught by the aforementioned patents.

Efforts have also been made to adopt torsion springs in the suspension systems. However, such efforts have not been successful because there are several problems inherent to torsion springs. For example, torsion springs are generally installed by winding them around transversely extending shafts and the springs are rapidly worn by being brought into rubbing contacts with the shafts. Further, rubbing contacts are also produced between coils of the same spring and cause wear of the spring.

It is therefore an object of the present invention to provide suspension systems for tracked vehicles in which compression type suspension springs are used with novel linkages so that increased displacement strokes can be provided for the springs.

Another object of the present invention is to provide track suspension systems for vehicles which have substantially uniform spring coefficient throughout the displacement strokes of the suspension springs.

A further object of the present invention is to provide suspension systems for tracked vehicles in which oleo-type shock absorbers having compression springs are associated with novel linkages so that the displacement speeds of the pistons in the absorbers can be increased to provide increased damping functions.

Still further object of the present invention is to provide vehicle suspension systems which can afford satisfactory comfortableness and less possibility of bottoming of the suspension springs.

According to the present invention, the above and other objects can be accomplished by a tracked vehicle including frame means, endless track means having front and rear end portions and upper and lower runs, power driven wheel means engaged with the endless track means at the front end portion thereof, slide rail means extending along and engaged with said lower run of the endless track means, suspension spring means including compression spring means and having one end connected with said slide rail means, first link means having one end pivotably connected with the frame means and the other end pivotably connected with the slide rail means, crank lever means mounted on said frame means for swingable movement about a pivot axis, said crank lever means having one end located above said pivot axis and connected with the other end of the suspension spring means, second link means having one end pivotably connected with the slide rail means at a pivot point, the other end of the crank lever means being located rearwardly of a line passing through the pivot axis and the pivot point and connected with the other end of the second link means.

The suspension spring means may be connected directly with the slide rail means, however, in a preferable arrangement, it is connected through the first link means. In this instance, the first link means may be formed with an extension beyond the point of connection with the slide rail means and the suspension spring means may be connected with the extension of the first link means. Preferably, the extension of the first link means has an arm length which is small in relation to that of the first link means so that the spring force of the suspension spring means acts on the slide rail means at the front portion thereof to maintain the slide rail means in engagement with the lower run of the track means.

In a preferable aspect of the present invention, said one end of the crank lever means is connected through further link means with swingable arm means which is connected at one end with the suspension spring means and mounted at the other end on a shaft carrying idler wheel means which is in engagement with the upper run of the endless track means. The suspension spring means may have oleo type damping means including reciprocating piston means. The link mechanism of the present invention has been found effective in increasing the piston displacement speed to provide an increased damping property.

The above and other objects and features of the present invention will become apparent from the following descriptions of preferred embodiments taking reference to the accompanying drawings, in which.

Figure 1:
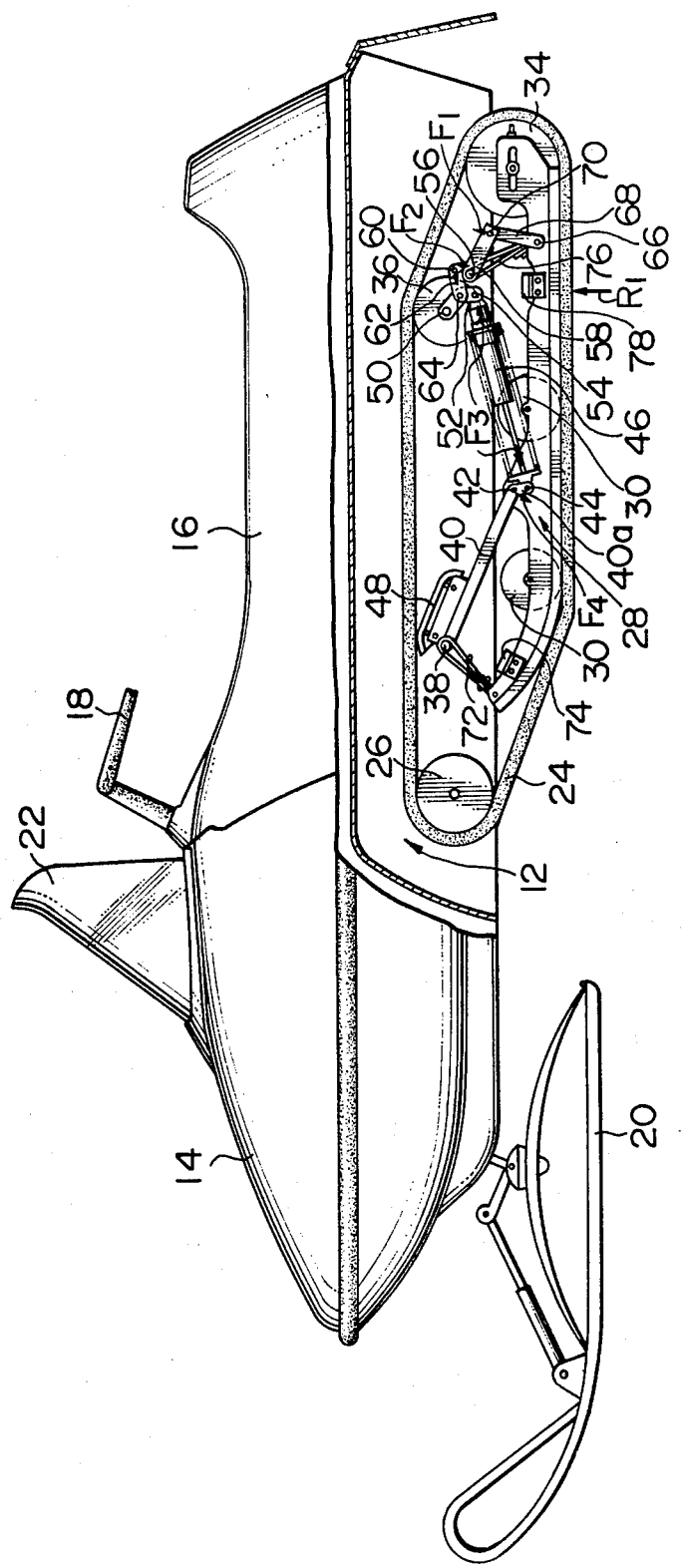
FIG. 1 is a partially cutaway side view of a snowmobile having a track suspension system in accordance with one embodiment of the present invention.

Referring now to the drawings, particularly to FIG. 1, the snowmobile shown therein includes a frame 12 on which an engine (not shown) is mounted and covered by an engine cover 14. The frame 12 carries a seat 16 and a steering handle 18 which is adapted to steer a pair of skis 20 provided at the front portion of the frame 12. On the frame 12, there is provided a windshield 22.

Figure 2:
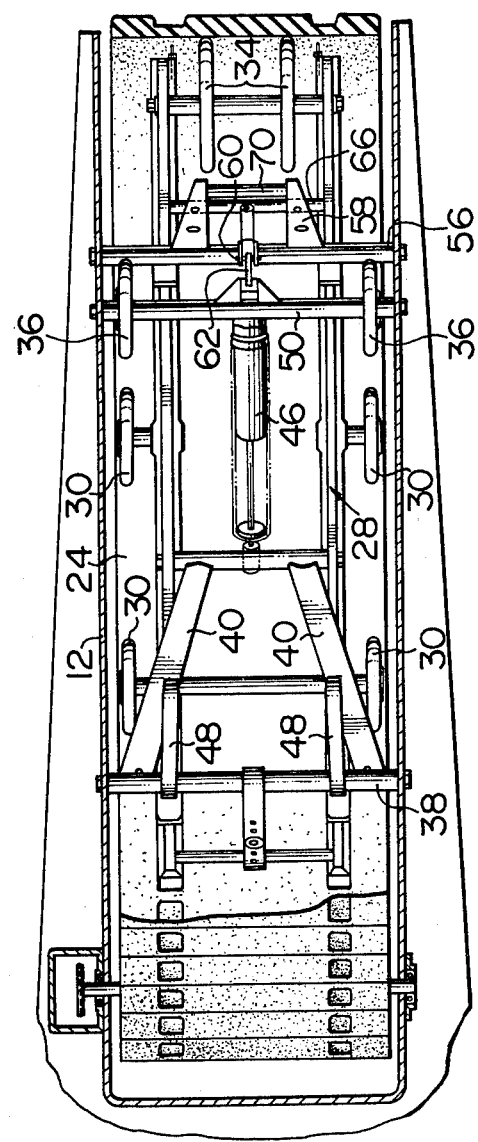
FIG. 2 is a horizontal sectional view of the suspension system shown in FIG. 1.
Figure 3:
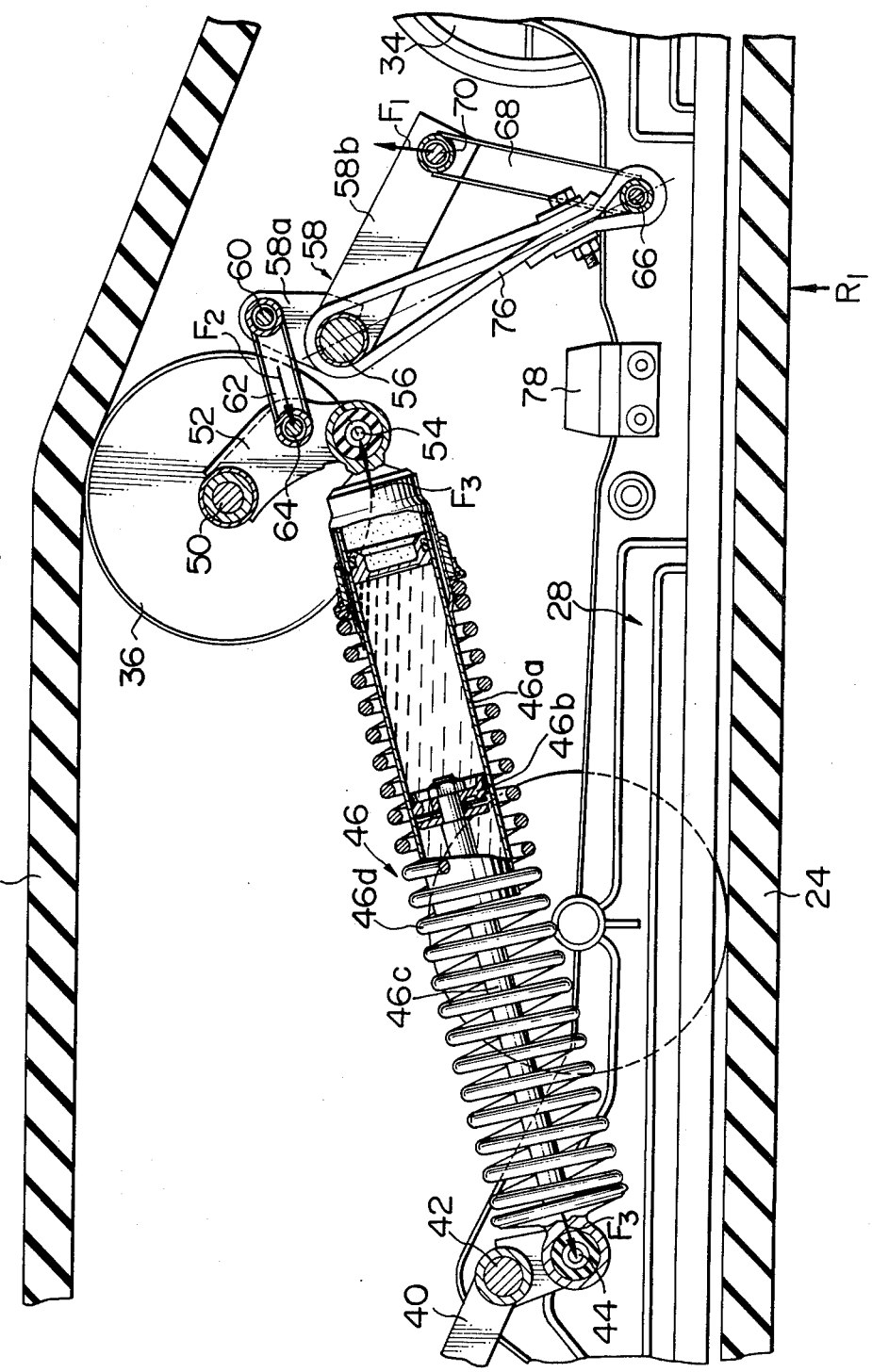
FIG. 3 is an enlarged sectional view showing the rear suspension mechanism; and, FIG. 4 is a vertical section of the suspension system in accordance with another embodiment of the present invention.

The snowmobile further includes an endless track or crawler 24 which is located to extend beneath the frame 12. As shown in FIG. 1, the endless track 24 is engaged at the front end portion thereof with a driving wheel or sprocket 26 which is driven by the engine. Referring now to FIGS. 2 and 3 as well as FIG. 1, it will be noted that there is a slide rail assembly 28 which is comprised of a pair of parallel slide rail members extending along the inner surface of the lower run of the endless track 24. The slide rail assembly 28 is mounted on the frame 12 through front and rear suspension mechanisms. The slide rail assembly 28 carries a suitable number of idler wheels 30 for engagement with the lower run of the endless track 24 and rear guide wheels 34. Further guide wheels 36 are mounted on the frame 12 and engaged with the upper run of the endless track 24.

The front suspension mechanism for the slide rail assembly 28 comprises a pair of parallel front suspension links 40 each having one end pivotably connected at the pivot point 38 with the frame 12. The other end of each link 40 is pivotably connected at the pivot point 42 with each of the slide rail members at an intermediate portion thereof. The link 40 has an extension 40a extending beyond the pivot point 42 for the purpose which will be described later.

The rear suspension mechanism includes a suspension spring assembly 46 comprising an oleo-cylinder 46a and a piston 46b slidable in the cylinder 46a. The piston 46b is connected with a piston rod 46c which extends outwardly beyond the cylinder 46a. Between the piston rod 46c and the cylinder 46a, there is provided a compression spring 46d. The suspension spring assembly 46 may be of any known type. The piston rod 46c is connected at the outer end with the extensions 40a of the front suspension links 40 through a transverse pin 44.

As shown in FIG. 2, the guide wheels 36 are carried by a transversely extending shaft 50. A swingable arm 52 is pivotably mounted at one end on the shaft 50, the other end of the arm 52 being connected by means of a pin 54 with the outer end of the cylinder 46a. A substantially L-shaped crank lever 58 is mounted on the frame 12 by means of a shaft 56 which carries the lever 58 at an intermediate portion thereof. The crank lever 58 has an arm 58a connected through a pin 60 with one end of a link 62 which is in turn connected at the other end through a pin 64 with the swingable arm 52 at an intermediate portion of the arm 52. The crank lever 58 has a second arm 58b which is connected with one end of a second link 68, the other end of the second link 68 being connected through a pin 66 with the slide rail assembly 28. In FIG. 3, it will be noted that the shaft 56 for pivotably supporting the crank lever 58 is located rearwards of the shaft 50 for carrying the guide wheels 36. The pivot pin 60 connecting the arm 58a of the crank lever 58 with the link 62 is located above the shaft 56. Further, the pin 70 connecting the arm 58b of the crank lever 58 with the second link 68 is located rearwardly of a line passing through the axis of the shaft 56 and the axis of the pin 66.

In FIGS. 1 and 2, it will be noted that each of the front suspension links 40 carries at its front end portion a sliding shoe 48 which is adapted for supporting engagement with the upper run of the endless track 24. The front end of the sliding rail assembly 28 is connected with the pivot shaft 38 by means of a belt 72 so that the front end of the sliding shoe assembly 28 is free to move toward the pivot shaft 38 but restricted to move in the opposite direction beyond a predetermined distance. Each rail member of the sliding rail assembly carries a stopper pad 74 which is adapted to abut the first or front suspension link 40 when the sliding rail assembly 28 is swung upwardly.

Between the shaft 56 for carrying the crank lever 58 and the pivot pin 66 for supporting the second link 68, a belt 76 is provided for preventing the rear portion of the slide rail assembly 28 from moving downwardly apart from the frame 12 beyond a predetermined limit. The slide rail assembly 28 is further provided at the rear portion thereof with stopper pads 78 which are adapted for abutting engagement with the shaft 56 for limiting the upward movement of the sliding rail assembly 28.

In operation, an upwardly directed force $R_1$ will be applied to the lower run of the endless track 24 as shown in FIGS. 1 and 3. The force is then transmitted through the second link 68 to the pivot pin 70 as shown by $F_1$ so that a moment is produced about the shaft 56. Thus, an axial force $F_2$ is produced in the link 62. Since the arm 58a is shorter in length than the arm 58b, the force $F_2$ is greater than the force $F_1$. The axial force $F_2$ in the link 62 is applied to the swingable arm 52 so that the suspension spring assembly 46 is compressed and a reaction force $F_3$ is produced in the assembly 46. Since the arm length between the shaft 50 and the pin 64 is smaller than the arm length between the shaft 50 and the pin 54, the reaction force $F_3$ is smaller than the axial force $F_2$. It should be understood that the compression force as applied to the suspension spring assembly 46 can appropriately be determined simply by selecting the lever ratios in the crank lever 58 and in the swingable arm 52. The arrangement is such that the arm length between the shaft 50 and the pin 64 and the arm length between the shaft 50 and the pin 54 do not change significantly throughout the operating stroke of the suspension spring assembly 46 so that it is possible to maintain the spring coefficient of the assembly 46 substantially uniform. It should further be noted that, by suitably determining the lever ratios in the crank lever 58 and in the swingable arm 52, it is possible to increase the displacement speed of the piston 46b to thereby increase the damping function.

The compression force $F_3$ in the suspension spring assembly 46 is applied to the extension 40a of the front suspension link 40 so that a downwardly directed force $F_4$ is produced at the pivotable connections 42 between the links 40 and the slide rail assembly 28. Since the lever arm length between the shaft 38 and the pin 42 is large in relation to the arm length between the pins 42 and 44, it is possible to maintain the force $F_4$ at a sufficiently high value. With this arrangement, it is possible to eliminate any other springs for biasing the front end portion of the slide rail assembly 28. The arrangement is further advantageous in that the suspension spring assembly 46 can be provided with satisfactory freedom of movement and with a sufficient stroke of displacement. Since there is a substantial space between the rear end portion of the slide rail assembly 28 and the suspension linkage, a substantial upward stroke is permitted for the rear portion of the slide rail assembly 28.

Referring now to FIG. 4 which shows another embodiment of the present invention with corresponding parts by the same reference numerals as in FIGS. 1 through 3, the front suspension link 40 is connected by means of a pivot pin 42 with the slide rail assembly 28 but the link 40 does not have an extension for connection with the suspension spring assembly 46. Instead, the suspension spring assembly 46 is connected with the slide rail assembly through a pivot pin 80. A torsion spring 82 is provided between the shaft 38 and the front portion of the slide rail assembly 28 so as to bias the assembly 28 downwardly. In the rear suspension mechanism, the belt 76 is not provided between the shaft 56 and the pivot pin 66 but the slide rail assembly 28 is provided forwardly of the stopper pad 78 with a transverse rod 84 and the belt 76 extends between the shaft 56 and the rod 84.

The invention has thus been shown and described with reference to specific embodiments, however, it should be noted that the invention is in no ways limited to the details of the illustrated structures but changes and modifications may be made without departing from the scope of the appended claims.

I claim:

1. Vehicle including frame means, endless track means having front and rear end portions and upper and lower runs, power driven wheel means engaged with the endless track means at the front end portion thereof, slide rail means extending along and engaged with said lower run of the endless track means, suspension spring means including compression spring means and having one end connected with said slide rail means, first link means having one end pivotably connected with the frame means and the other end pivotably connected with the slide rail means, crank lever means mounted on said frame means for swingable movement about a pivot axis, said crank lever means having one end located above said pivot axis and connected with the other end of the suspension spring means, second link means having one end pivotably connected with the slide rail means at a pivot point, the other end of the crank lever means being located rearwardly of a line passing through the pivot axis and the pivot point and connected with the other end of the second link means.

2. Vehicle in accordance with claim 1 in which said first link means is formed with extension means beyond point of connection with the slide rail means, said suspension spring means being connected with the extension means of the first link means.

3. Vehicle in accordance with claim 2 in which said extension means is of a length which is small in relation to that of the first link means.

4. Vehicle in accordance with claim 1 in which said crank lever means is connected through further link means with swingable arm means which is connected at one end with the suspension spring means and mounted at the other end on a shaft carrying idler wheel means which is in engagement with the upper run of the endless track means.

5. Vehicle in accordance with claim 1 in which said suspension spring means includes oleo-type damping means.

6. Vehicle including frame means, endless track means having front and rear end portions and upper and lower runs, power driven wheel means engaged with the endless track means at the front end portion thereof, slide rail means extending along and engaged with said lower run of the endless track means, suspension spring means including compression spring means and having one end connected with said slide rail means, first link means having one end pivotably connected with the frame means and the other end pivotably connected with the slide rail means, crank lever means mounted on said frame means for swingable movement about a pivot axis, said crank lever means having one end located above said pivot axis and connected with an arm which has an upper end pivotably mounted on the frame and a lower end connected with the other end of the suspension spring means, second link means having one end pivotably connected with the slide rail means at a pivot point, the other end of the crank lever means being connected with the other end of the second link means.

7. Vehicle in accordance with claim 6 in which said one end of the crank lever means is connected with the arm through a further link.

8. Vehicle in accordance with claim 6 in which said other end of the suspension spring means is connected with the arm at a position farther from the point where the arm is pivotably mounted on the frame means as compared with the position where the one end of the crank lever means is connected with said arm.

* * * * *